United States Patent [19]
Bergmann et al.

[11] Patent Number: 5,887,429
[45] Date of Patent: Mar. 30, 1999

[54] HYDRAULIC STEERING SYSTEM WITH LOAD SIGNAL

[75] Inventors: Erhard Bergmann, Mirow; Manfred Schildmann; Gerhard Voss, both of Parchim, all of Germany

[73] Assignee: Hydraulik Nord GmbH, Parchim, Germany

[21] Appl. No.: 860,618

[22] PCT Filed: Feb. 10, 1996

[86] PCT No.: PCT/DE96/00217

§ 371 Date: Aug. 1, 1997

§ 102(e) Date: Aug. 1, 1997

[87] PCT Pub. No.: WO96/26099

PCT Pub. Date: Aug. 29, 1996

[30] Foreign Application Priority Data

Feb. 18, 1995 [DE] Germany ......... 195 05 592.6

[51] Int. Cl.[6] .................................................. F16D 31/02
[52] U.S. Cl. ........................................................ 60/384
[58] Field of Search .............................. 60/384, 387, 388

[56] References Cited

U.S. PATENT DOCUMENTS 4,043,419  8/1977  Larson et al. ............................. 60/384
4,620,416  11/1986  Yip et al. ................................. 60/384
4,730,544  3/1988  Jorgensen .

FOREIGN PATENT DOCUMENTS

0061 005   9/1982   European Pat. Off. .
0 561 401 A1  9/1993   European Pat. Off. .
44 10 693 A1  10/1995  Germany .
2 014 096  8/1979   United Kingdom .

*Primary Examiner*—F. Daniel Lopez
*Attorney, Agent, or Firm*—Darby & Darby

[57] ABSTRACT

Conventional steering systems of this type have the disadvantage that the dynamic load signal flow is lossy which has a negative effect on the energy efficiency. Another disadvantage arises in steering systems with a closed-center design. When the steering cylinder is pulled by an external force, the steering cylinder moves in advance of the apportioned steering flow. In the present novel steering system, the adjusting angles of the primary adjustable throttles (12, 13, 14, 15, 16, 17) are matched in a novel way, so that in a steering range where the steering rotational speed is limited, the load signal flow is used for actuating the steering system. In this phase, the steering system then operates according to the open-center principle.

5 Claims, 9 Drawing Sheets

NEUTRAL POSITION

*Fig. 4*

SLIGHT EXCURSION

Fig. 5

GREATER EXCURSION

Fig. 6

MAXIMUM EXCURSION

Fig. 9

HYDRAULIC STEERING SYSTEM WITH LOAD SIGNAL

BACKGROUND OF THE INVENTION

Field of the Invention

The invention relates to a steering system having a displacement unit and a control unit including an inner control piston and an outer control sleeve, wherein both the control piston and the control sleeve include axially and radially extending channels which communicate with each other and with the displacement unit. The channels form a main conduit extending from a supply connection through the displacement unit and a steering cylinder to a return connection, in which main conduit there are disposed an adjustable input throttle between the supply connection and the displacement unit, two adjustable throttles between the displacement unit and the steering cylinder, and an adjustable return throttle between the steering cylinder and the return connection. A first side conduit extends from the main conduit downstream of the adjustable input throttle to the return connection, in which first side conduit there are disposed a first and a second adjustable load signal throttle, and a second side conduit extending from the load signal connection to the first side conduit at the height between the first and the second adjustable load signal throttle. In the neutral position the first adjustable load signal throttle has a positive overlap as compared to the other adjustable throttles. Steering systems of this type are used in mobile installations which include a steering loop and an operating loop wherein both loops have a common supply pump and the steering loop has priority.

Installations of this type consist, on one hand, mainly of a common supply pump and a common flow division control valve as well as of the steering system and steering cylinder, and, on the other hand, of an operating loop. The flow division control valve is spring biased and receives its control signal in form of a so-called load signal from the hydraulic steering system. The flow division control valve regulates its flow cross sections based on the load signal such that the steering loop is assigned a higher priority and supplied with hydraulic oil as needed, whereas the operating loop receives the excess hydraulic oil. It is known that the load signal can be processed statically or dynamically. Due to the fast reaction speed of the dynamic load signal, the latter processing method is becoming more prevalent in practical applications.

A steering system of this type is described, for example, in the German Patent Application P 44 10 693.9 by the applicant. It consists of a displacement unit and a control unit with an inner control piston and an outer control sleeve provided with channels communicating with each other and with the displacement unit. The channels form a main conduit extending from the input connection to the displacement unit, with an adjustable input throttle interposed therebetween, another main conduit containing adjustable throttles and extending from displacement unit to the steering cylinder, and another main conduit including an adjustable return throttle extending from the steering cylinder to the return connection.

The channels furthermore form a first side conduit which extends from the main conduit downstream of the adjustable input throttle to the return connection and includes a first and second adjustable load signal throttle and a constant throttle.

The channels, in addition, form a second side conduit which extends from the load signal connection to the first side conduit and discharges between the first and the second adjustable load signal throttle.

The adjustable input throttle, the adjustable return throttle and the second adjustable load signal throttle close in the same direction. The first adjustable load signal throttle closes in the opposite direction as the aforementioned adjustable throttles.

This steering system is rather sophisticated and has significant advantages. It has, however, the same disadvantages as any other steering system controlled by load signals. When the steering is not operated, the entire load signal flow has to be regarded as wasted, and even when the steering excursions are small, there is still a certain portion of the flow wasted, all of which has a negative effect on the energy efficiency of the hydraulic installation.

All steering systems with a closed-center design have a further disadvantage. When the steering cylinder of a closed-center steering system is pulled by an external force in the steered direction and the control unit of the steering system is steered from the neutral position into the corresponding operating position, the steering cylinder moves in advance of the apportioned flow of the hydraulic oil, causing the steering response during this phase to be uncontrolled.

A steering system of similar design is known from EP 0561 401 A1. This steering system, however, is provided with an open center and includes a connection for a pressure signal from a pressure switch for actuating the electric motor of the hydraulic pump.

The steering system is consequently not suitable for the intended application.

SUMMARY OF THE INVENTION

It is therefore the object to design a steering system with a dynamic load signal connection so that the steering cylinder is clasped as tightly as possible during the steering process.

This object is attained by providing an angle of excursion of the positive overlap of the first adjustable load signal throttle which is equal to or smaller than the angle of excursion of the negative overlap of the adjustable input throttle and the angles of excursion of a negative overlap of the adjustable return throttle, of the second adjustable load signal throttle and of the two adjustable throttles are smaller than the angle of excursion.

Further, a hydraulic steering system is provided, wherein the angles of excursion of the adjustable return throttle, of the second adjustable load signal throttle and of the adjustable throttles, in this order, are each smaller by an increasing amount than the angle of excursion of the first adjustable load signal throttle.

In addition, a hydraulic steering system is provided, wherein the open throttle cross section of the first adjustable load signal throttle in the region where the adjustable return throttle opens, such as to remain essentially constant over a predeterminable interval of the angle of excursion.

This steering system has several advantages.

For example, when the steering cylinder is subjected to a pulling load, the desired steering performance improves if only the adjustable input throttle remains closed for a longer period of time so that only the existing load signal flow is utilized for operating the steering system in a steering range where the steering rotational speed is limited. In this phase, the steering system operates using the open-center method. It is therefore possible to predetermine the return pressure of the steering cylinder at the beginning of the steering process.

Since now the load signal flow is used to the greatest extent possible, the energy efficiency of the steering system improves at the same time. The steering system also is able to react faster.

DETAILED DESCRIPTION OF THE PRESENTLY PREFERRED EMBODIMENTS

The flow loop of a hydraulic installation for a steering loop and one or more operating loops is known in the art and is not shown in detail. It consists of a common supply pump and a common flow division control valve.

Figure 1:
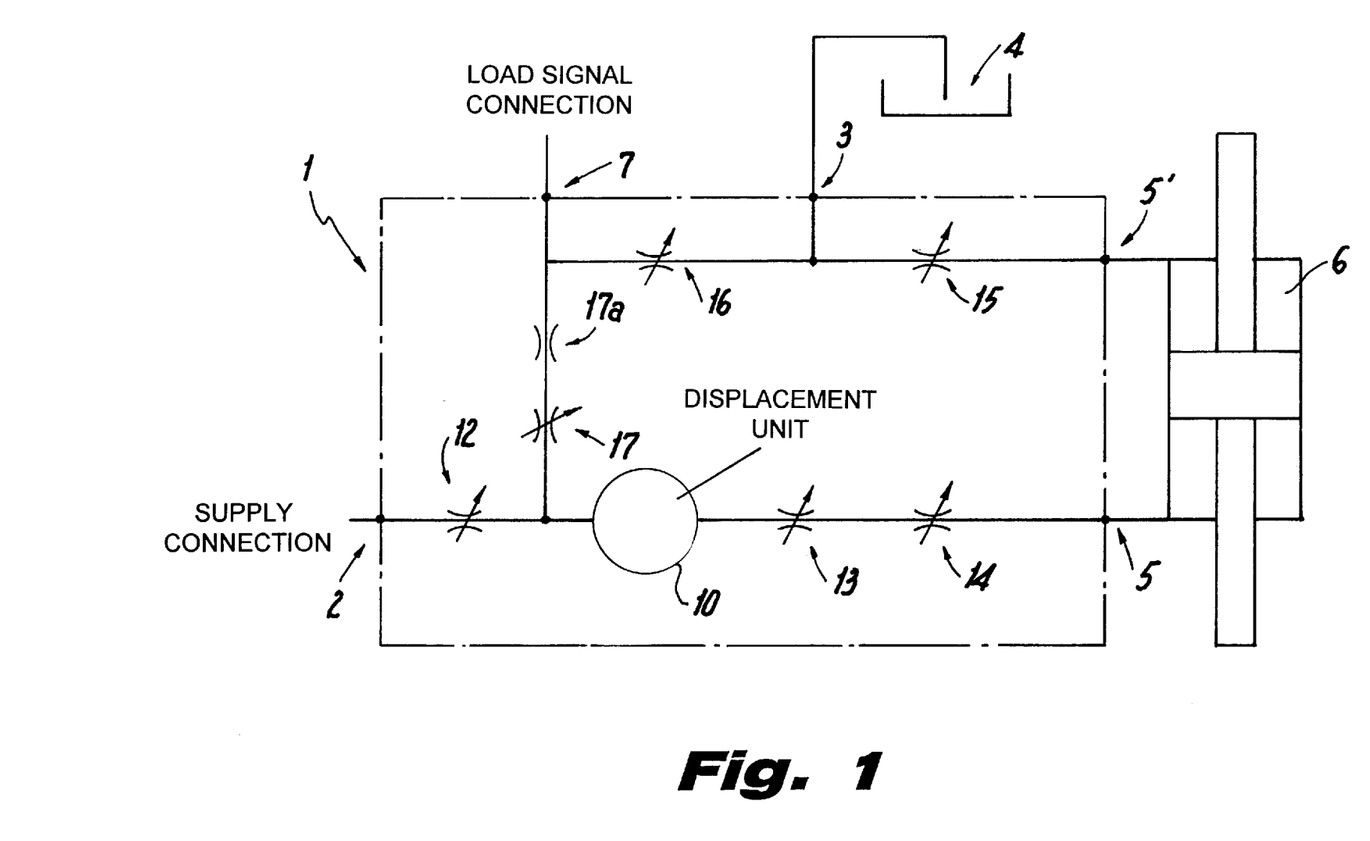
FIG. 1 a simplified diagram of a steering system with a load signal.

As shown in FIG. 1, the steering system 1 has a supply connection 2 connected to the steering connection of the flow division control valve, a return connection extending to the supply connection 2 and to the spring-biased side of the flow division control valve.

Figure 2:
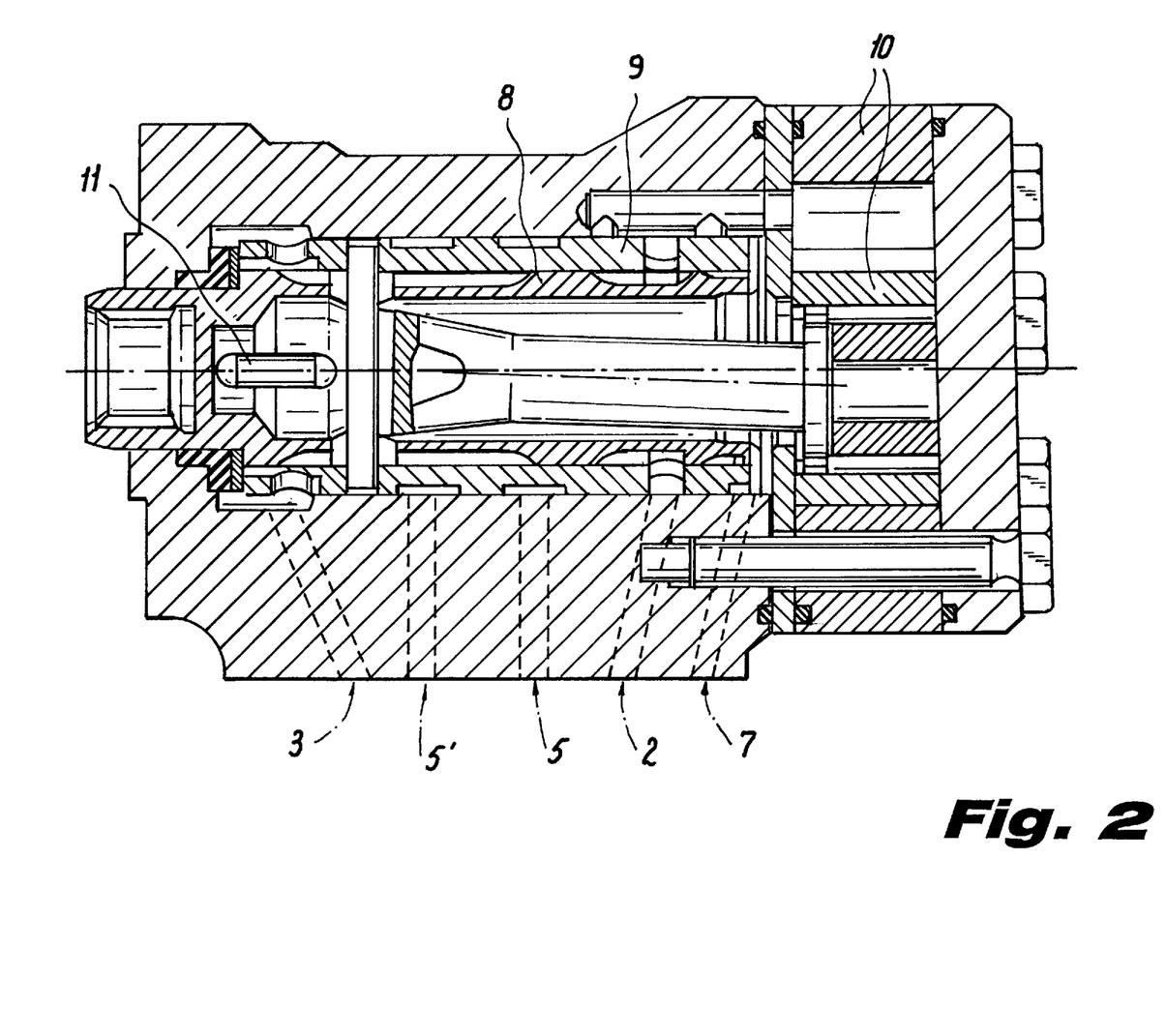
FIG. 2 the steering system in cross section.

As shown more clearly in FIG. 2, the steering system 1 essentially includes a control unit with an inner control piston 8 and an outer control sleeve 9 and a displacement unit 10 operating according to the Gerotor principle. The control piston 8 and the control sleeve 9 include axially and radially extending channels communicating with each other and with the displacement unit 10 and adapted for rotation with respect to each other within a limited angle against the force of a spring 11. The control sleeve 9 is mechanically connected to the displacement unit.

According to FIG. 1, the channels in the control unit of the steering system 1 form a main conduit extending from the supply connection 2 through the displacement unit 10 and the steering cylinder 6 to the return connection 3. In the main conduit, there are disposed an adjustable input throttle 12 between the supply connection 2 and the displacement unit 10, two adjustable throttles 13 and 14 between the displacement unit 10 and the steering cylinder 6, and an adjustable return throttle 15 between the steering cylinder 6 and the return connection 3. In addition, the channels in the control unit of the steering system 1 form a first side conduit extending from the main conduit downstream of the adjustable input throttle 12 to the return connection 3, the first side conduit including a first adjustable load signal throttle 16, a second adjustable load signal throttle 17 and a constant throttle 17a.

The channels in the control unit of the steering system 1 furthermore form a second side conduit extending from the load signal connection 7 to the first side conduit and discharging into the first side conduit between the first adjustable load signal throttle 16 and the second adjustable load signal throttle 17.

The adjustable input throttle 12, the adjustable return throttle 15 and the second adjustable load signal throttle 17 close in the same direction. The first adjustable load signal throttle 1 6 closes in the opposite direction as the adjustable throttles 12, 15 and 17 mentioned previously.

The construction of a corresponding steering system is depicted in the FIGS. 4 to 7.

An annular channel 18 of the control sleeve 9 and an annular channel 19 of the control piston 8 for the supply flow as well as an annular channel 20 of the control sleeve 9 and an annular channel 21 of the control piston 8 for the load signal flow are each in a respective overlapping position. Radial bores 22 of the control sleeve 9 connected to the annular channel 20 and matching slots 23 positioned in the control piston 8 and connected to the inner space of the control unit, form the first adjustable load signal throttle 16.

In the annular channel 21 of the control piston 8, there extend several spaced apart axial slots 24 of limited length which are in negative overlap with respect to radial bores 25, 25' disposed on both sides of the control sleeve 9. The slots 24 and the bores 25, 25' form the second adjustable load signal throttle 17.

The annular channel 18 of the control sleeve 9 for the supply flow is connected to the annular channel 19 of the control piston 8 through several radial bores 26 uniformly spaced along the circumference. This annular channel 19 also has axial slots 27 of limited length. The slots 27 are also in negative overlap with respect to the bores 28, 28' disposed on both sides of the control sleeve 9, which together form the adjustable input throttle 12.

The bores 28, 28' of the control sleeve 9 and the slots 29 of the control piston 8 form the adjustable throttle 13.

Additional offset rows of bores 30 and 31 in the control sleeve 9 form, in cooperation with the slots 29 and with additional slots 32 in the control piston 8, the adjustable throttle 14 or the adjustable return throttle 15, depending on the direction of the rotation.

According to the invention, the radial spacings of bores 22, 25, 25', 28, 28', 30 and 31 of the control sleeve 9 as well as the radial spacings of the slots 23, 24, 27, 29 and 32 of the control piston 8 which form, respectively, the first adjustable load signal throttle 17, the adjustable input throttle 12, the adjustable throttle 14 and the adjustable return throttle 15, are matched to each other for providing both positive and negative overlap.

Figure 3:
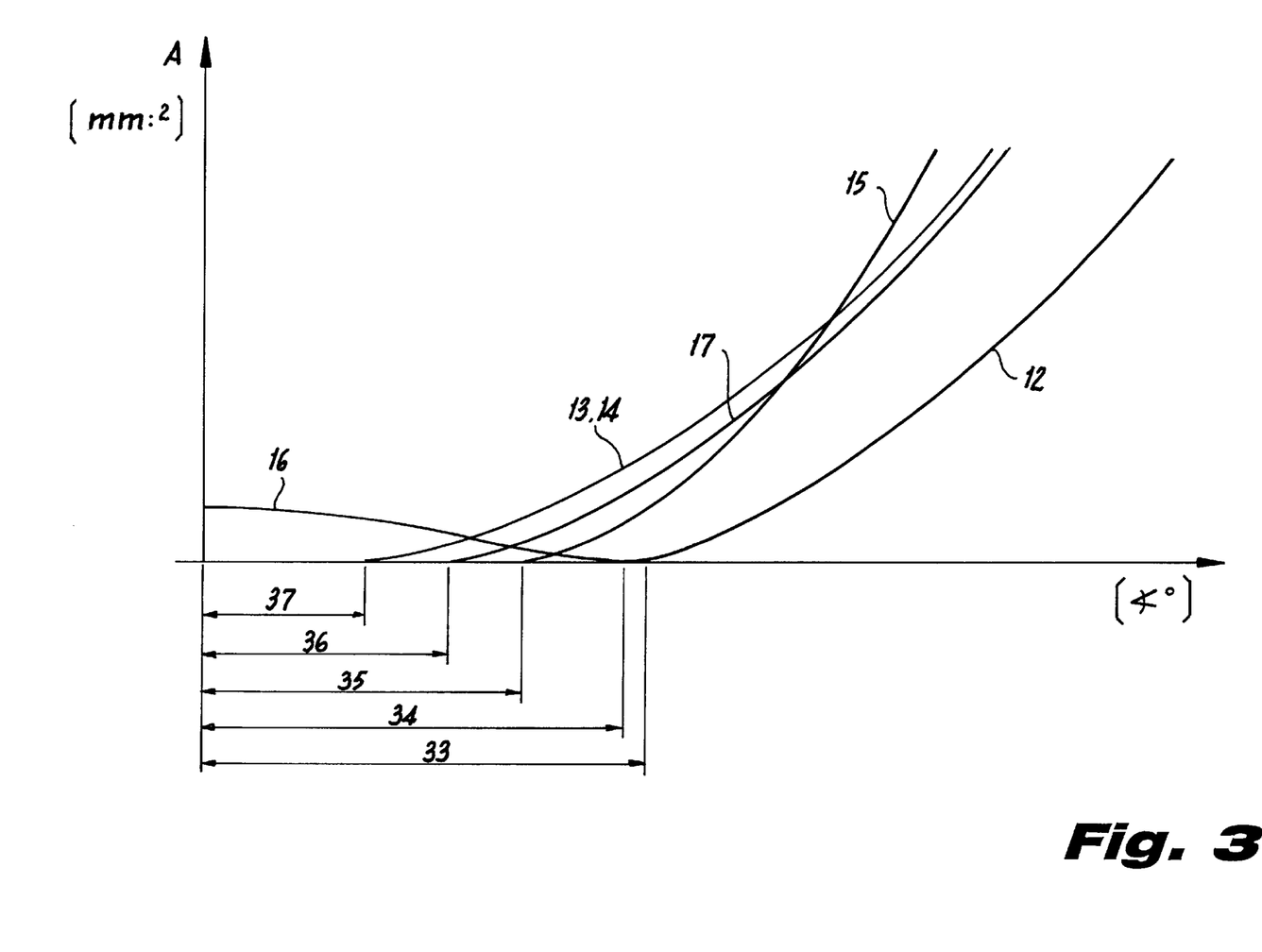
FIG. 3 a diagram showing the closing and opening function of the cooperating adjustable throttles, FIG. 4 the control unit in neutral position, FIG. 5 the control unit in a position with a slight excursion, FIG. 6 the control unit in a position with a greater excursion, FIG. 7 the control unit in a position with maximum excursion, FIG. 8 a diagram showing the closing and opening function of the cooperating adjustable throttles for an advantageous embodiment of the steering system, and FIG. 9 the advantageous embodiment of the steering system of FIG. 8.

Accordingly, the angle of excursion 33 in FIG. 3 relates to the positive overlap of the bores 22 and the slots 23 of the first adjustable load signal throttle 16.

Accordingly, the angle of excursion 34 relates to the negative overlap of the bores 28, 28' and the slots 27 of the adjustable input throttle 12.

Accordingly, the angle of excursion 35 relates to the negative overlap of the bores 30, 31 and the slots 32 of the adjustable return throttle 15.

Accordingly, the angle of excursion 36 relates to the negative overlap of the bores 25, 25' and the slots 24 of the second adjustable load signal throttle 17.

Accordingly, the angle of excursion 37 relates to the negative overlap of the bores 28, 28' and the bores 30, 31, respectively, and the slots 29 of the adjustable throttles 13 and 14.

When viewed from the closed neutral position of the control valve, the angles of excursion of the individual throttles are related as follows:

The angle of excursion 33 is equal to or smaller than the angle of excursion 34. The angles of excursion 35, 26 and 37, in this order, are each smaller by an increasing amount than the angle of excursion 33.

Figure 8:
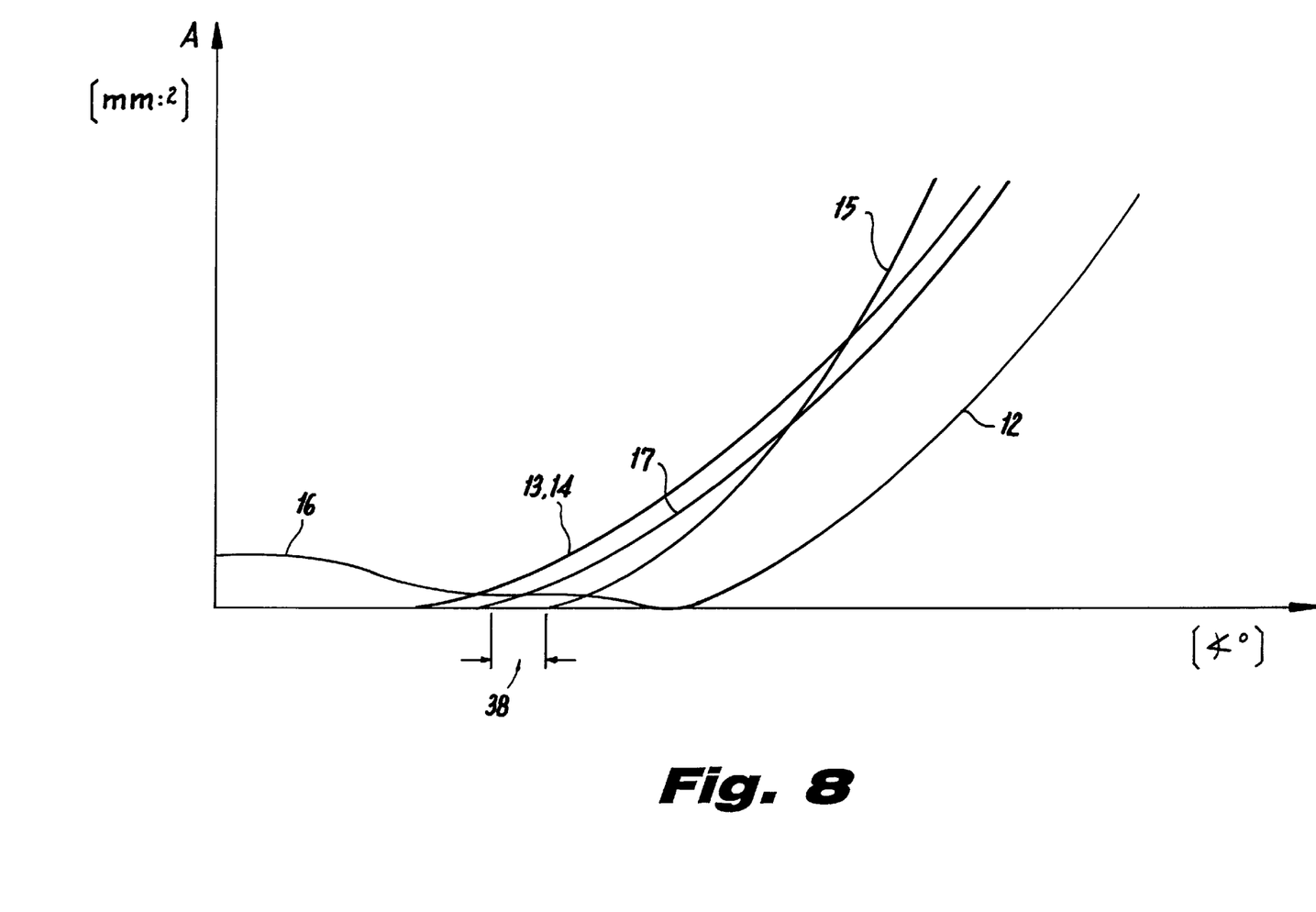

In an advantageous embodiment of the steering system, the first adjustable load signal throttle 16 is specially designed in order to accommodate possible manufacturing tolerances affecting the cooperation between the first adjustable load signal throttle 16 and the adjustable return throttle 15 which determines the desired bias pressure between the steering cylinder 6 and the adjustable return throttle 15. The opening properties of the first adjustable load signal throttle 16 are designed in such a way that the opening cross section does not decrease over a predetermined angle of excursion of the control unit. The interval 38 covering the angle of excursion in FIG. 8 is positioned in such a way that the point where the adjustable return throttle 15 opens, lies inside the range of this interval 38.

Figure 9:
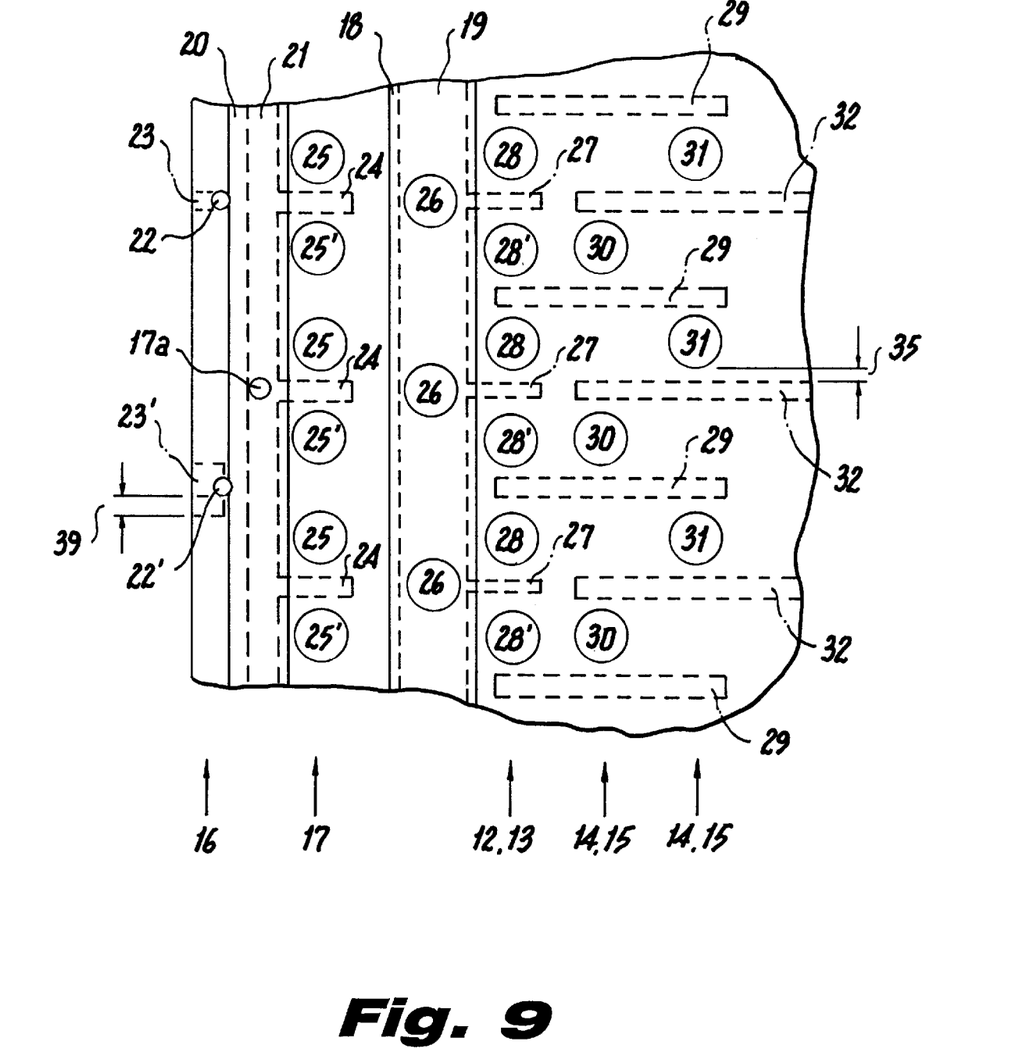

According to FIG. 9, therefore at least one of the first adjustable load signal throttles 16 formed of the bores 22 and the slots 23 is provided with a widened slot 23' and/or a reduced bore 22'. The width of the slot 23' and the diameter of the bore 22' are sized so that for a positive overlap there exists an interval 39 which is larger than the angle of excursion 35 for the negative overlap of the adjustable return throttle 15. Simultaneously, the diameters of the bores 22 and the widths of the slots 23 are sized so that their positive overlap is smaller than the angle of excursion 35.

Figure 4:
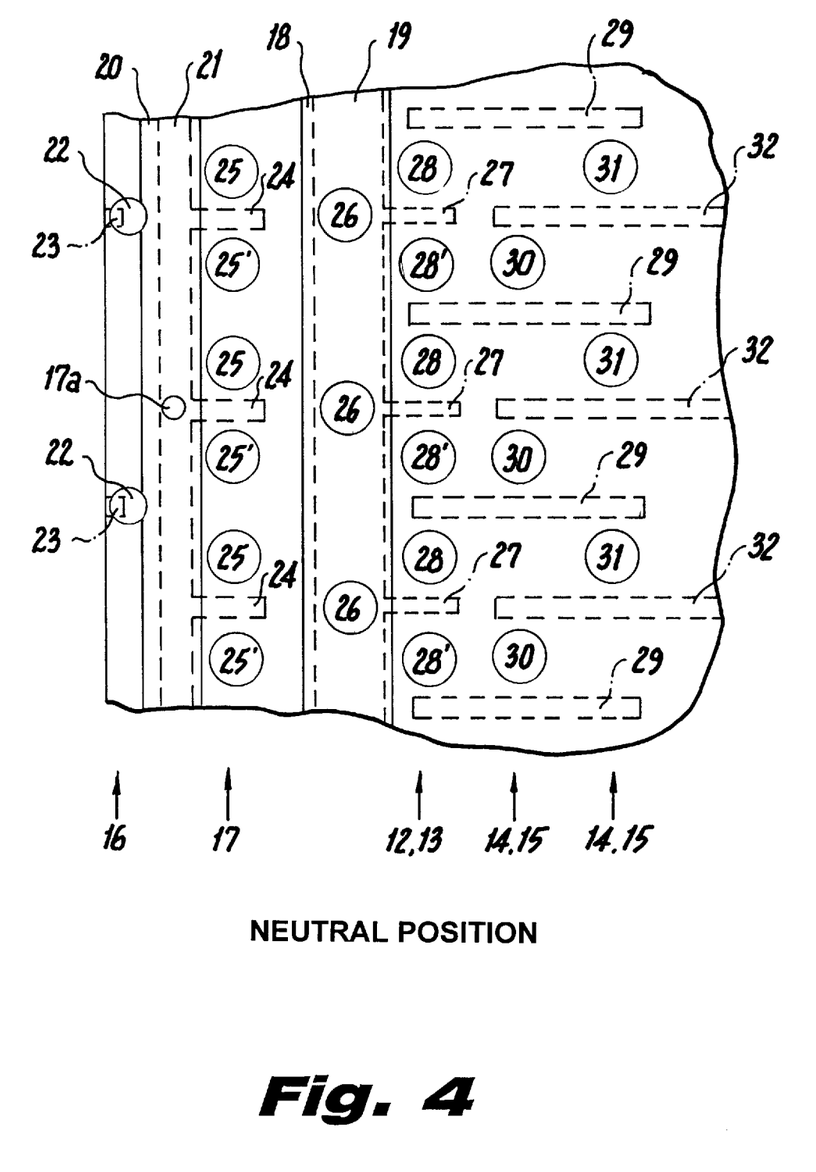
Figure 5:
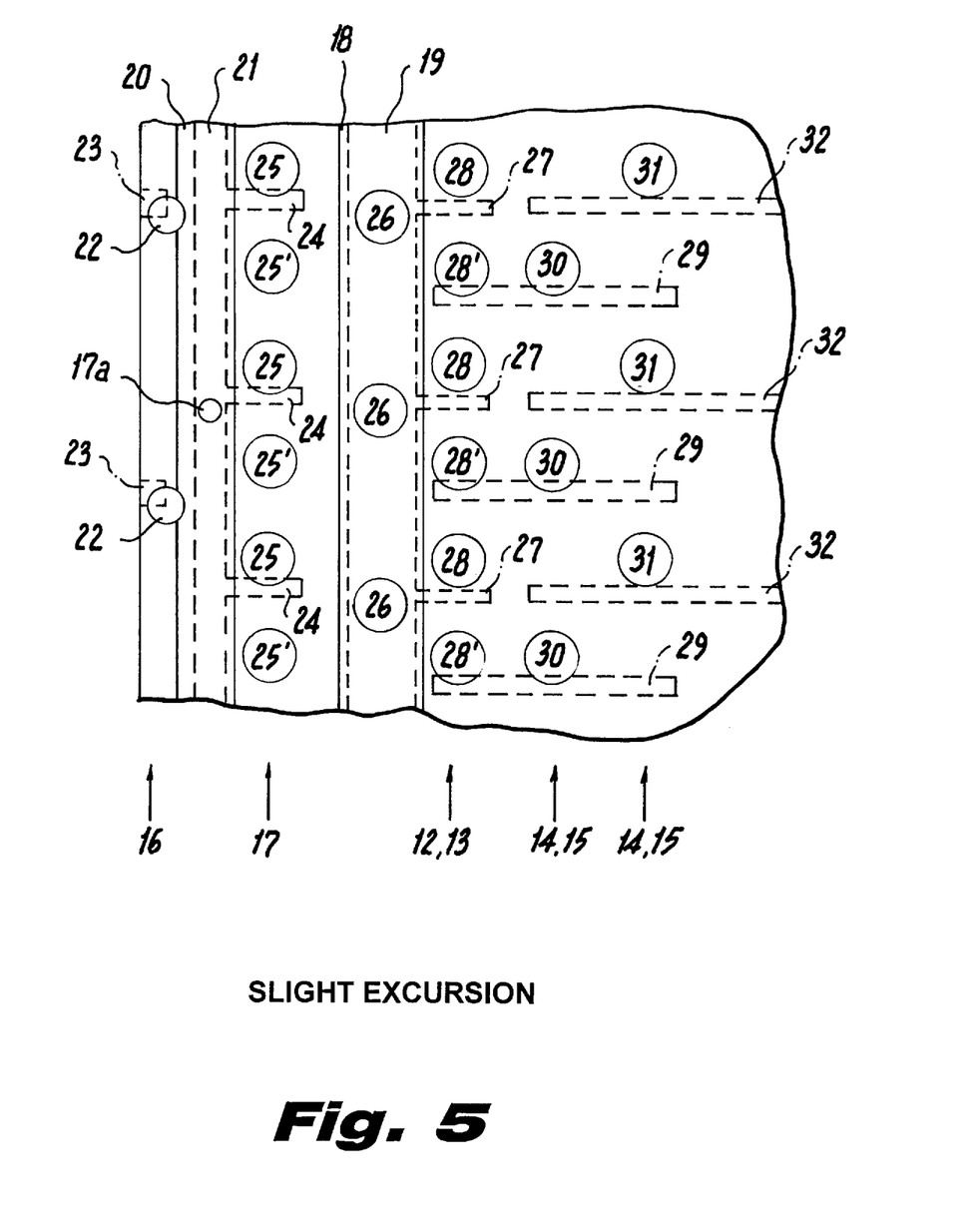
Figure 6:
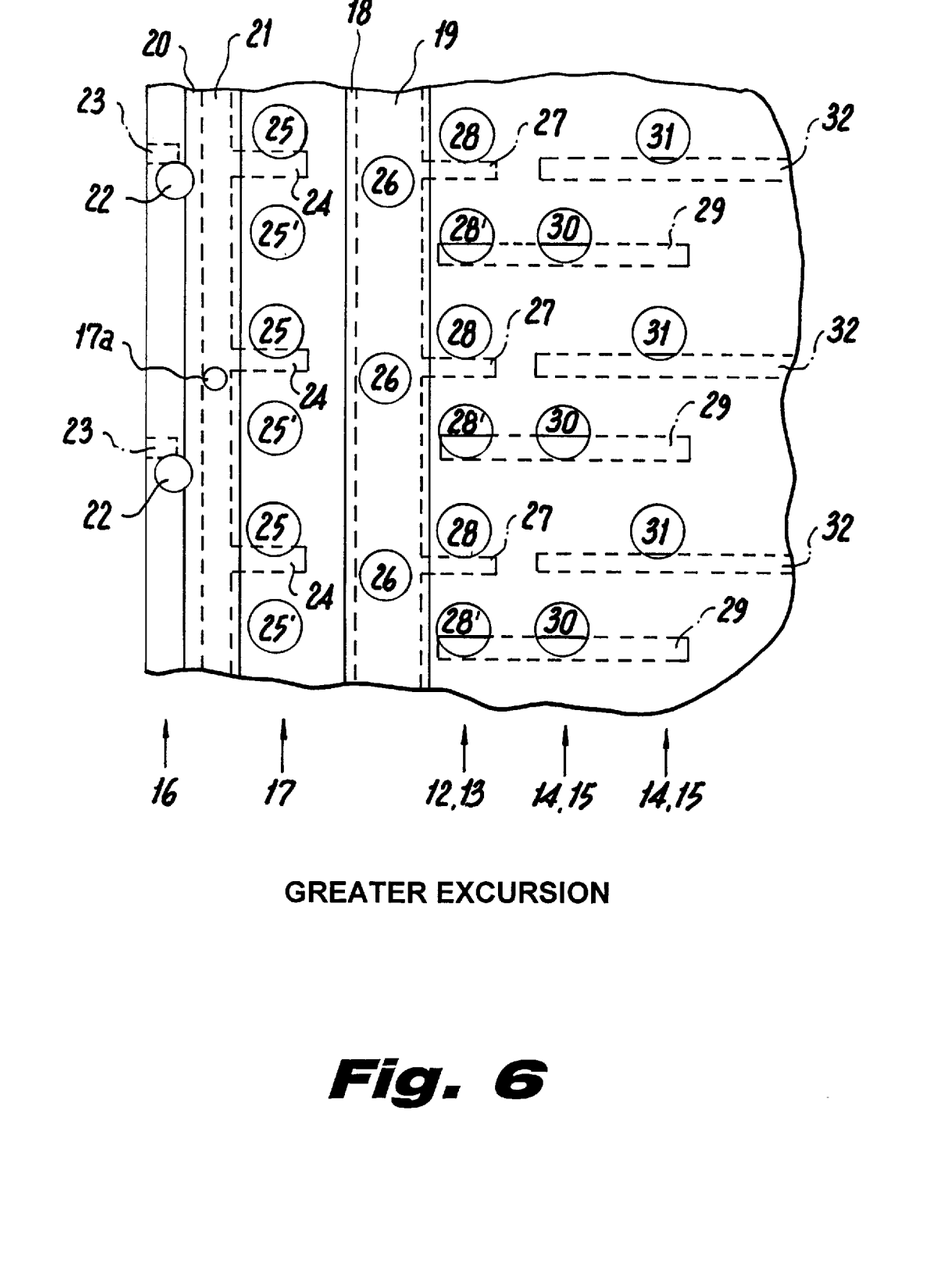
Figure 7:
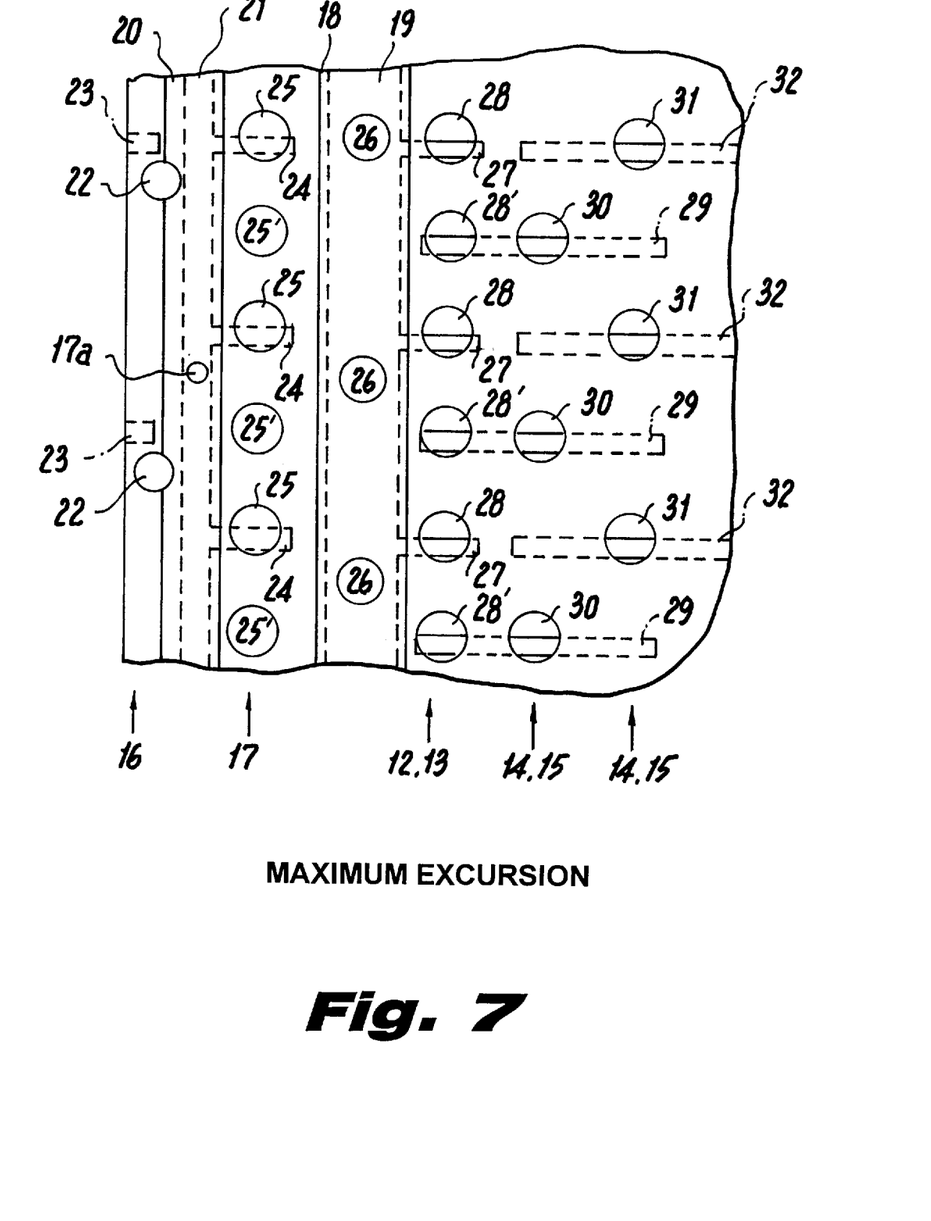

In the neutral position of the steering system 1 of FIG. 4, the adjustable input throttle 12 is closed since the slots 27 and the bores 28, 28' do not overlap. Also closed is the second adjustable load signal throttle 17, the adjustable throttles 13 and 14 and the adjustable return throttle 15. On the other hand, the first adjustable load signal throttle 16 is fully open since the bores 22 and the slots 23 overlap positively. Since the adjustable input throttle 12 is closed, the oil provided by the supply pump causes pressure to build up ahead of the supply connection 2. The pressure then switches the flow division control valve over to the operating hydraulics and causes a preset load signal flow to flow via the open first adjustable load signal throttle 16 to the return connection 3 and thus to the tank 4.

When the control piston 8 is displaced relative to the control sleeve 9 and the rotational speed is low, the first adjustable load signal throttle 16 starts to close first. As a result, the load signal flow of a certain magnitude is throttled back accordingly. With increasing excursion of the control piston 8, the adjustable throttles 13 and 14 and the second adjustable load signal throttle 17 begin to open, in that order. The built-up pressure of the load signal flow is therefore present at one of the cylinder connections 5, 5' and is similarly effecting the steering cylinder 6. Since the adjustable return throttle 15 is still closed, the steering cylinder 6 is clasped and is prevented from following an external load. During a further excursion of the control piston 8, when the first adjustable load signal throttle 16 is still open, the adjustable return throttle 15 begins to open. At this point, the steering process begins to operate according to the open-center principle, using the load signal flow with a predetermined return pressure of the steering cylinder 6.

Consequently, an equilibrium is established between the opening cross sections of the first adjustable load signal throttle 16 and the second adjustable load signal throttle 17 according to the flow division principle, with the equilibrium depending on the load on the steering cylinder 6 and the selected steering rotational speed.

If the load signal flow is, for example, 1 dm$^3$/min and if the displacement unit 10 of the steering system 1 supplies, for example, 100 cm$^3$/rotation, then the load signal flow alone allows a steering rotational speed of up to 10 rpm. If the steering rotational speed and consequently the required oil flow exceed the value of the load signal flow, then the adjustable input throttle 12 opens. In this state, the first adjustable load signal throttle 16 is closed. The steering process then again proceeds according to the closed-center principle, using the entire oil flow from the supply connection 2 and the load signal connection 7.

What is claimed is:

1. A hydraulic steering system with a load signal, comprising
   a displacement unit and
   a control unit including an inner control piston and an outer control sleeve, wherein the control piston and the control sleeve include axially and radially extending channels communicating with each other and with the displacement unit, and wherein the channels form
   a main conduit extending from a supply connection through the displacement unit and a steering cylinder to a return connection, in the main conduit there are disposed an adjustable input throttle between the supply connection and the displacement unit, two adjustable throttles between the displacement unit and the steering cylinder, and an adjustable return throttle between the steering cylinder and the return connection, and
   a first side conduit extending from the main conduit downstream of the adjustable input throttle to the return connection, in the first side conduit there are disposed a first and a second adjustable load signal throttle, and
   a second side conduit extending from the load signal connection to the first side conduit at a position between the first and the second adjustable load signal throttle,
   wherein in a neutral position the first adjustable load signal throttle is open, whereas the other adjustable throttles are closed, and
   wherein a first angle of rotation (33) where the first adjustable load signal throttle (16) closes, is equal to or smaller than an angle of rotation (34) where the adjustable input throttle (12) opens and that angles of rotation (35, 36, 37) where the adjustable return throttle (15), the second adjustable load signal throttle (17) and the two adjustable throttles (13, 14) open are smaller than the first angle of rotation (33).

2. The hydraulic steering system according to claim 1, wherein the angles of rotation (35, 36, 37) of the adjustable return throttle (15), the second adjustable load signal throttle (17) and the adjustable throttles (13, 14), in this order, are each smaller by an increasing amount than the first angle of rotation (33) of the first adjustable load signal throttle (16).

3. The hydraulic steering system according to claim 1, wherein a cross section of the first adjustable load signal throttle (16) in a region where the adjustable return throttle (15) opens, is so designed that it remains substantially constant over a predeterminable interval (38) of the angle of rotation (33).

4. The hydraulic steering system according to claim 3, wherein the first adjustable load signal throttle (16) is formed of a plurality of relatively movable bores and slots, and
   wherein in the neutral position, at least some of the bores (22) and the slots (23) forming the first adjustable load signal throttle (16) have a positive overlap which is smaller than an angle between neutral and the angle of rotation (35) where the adjustable return throttle (15) opens, and wherein at least one of the bores and slots forming the first adjustable load signal throttle (16) has a positive overlap (39) which is greater than the angle between neutral and the angle of rotation (35) where the adjustable return throttle (15) opens.

5. The hydraulic steering system according to claim 4, wherein one of the slots of (23') the first adjustable load signal throttle (16) is wider than the other slots (23) of the adjustable load signal throttle (16) and/or one of the bores (22') is smaller than the other bores (22) of the adjustable load signal throttle (16).

* * * * *